United States Patent [19]
Pirazzini

[11] Patent Number: 5,090,150
[45] Date of Patent: Feb. 25, 1992

[54] FISHING ROD WITH INTERCHANGEABLE LINE GUIDES, AND THE METHOD OF EMBODYING SUCH A ROD

[75] Inventor: Luca Pirazzini, Bologna, Italy
[73] Assignee: Reglass S.p.A., Bologna, Italy
[21] Appl. No.: 543,681
[22] Filed: Jun. 22, 1990

[30] Foreign Application Priority Data

Jul. 21, 1989 [IT] Italy ................... 3562 A/89

[51] Int. Cl.⁵ .................................. A01K 87/04
[52] U.S. Cl. ........................................... 43/24
[58] Field of Search ............ 43/24, 18.1, 18.5; 156/172

[56] References Cited

U.S. PATENT DOCUMENTS

| | | | |
|---|---|---|---|
| 3,400,481 | 10/1968 | Crestenson | 43/24 |
| 4,035,454 | 7/1977 | Klein | 43/24 |
| 4,186,508 | 2/1980 | Howald | 156/172 |
| 4,277,906 | 7/1981 | Nelli | 43/24 |
| 4,334,379 | 7/1982 | Nelli | 43/24 |
| 4,639,155 | 1/1987 | Schuster | 401/1 |

FOREIGN PATENT DOCUMENTS

| | | | |
|---|---|---|---|
| 1377264 | 9/1964 | France | 43/24 |
| 1132624 | 11/1968 | United Kingdom | 43/24 |

*Primary Examiner*—Kurt Rowan
*Assistant Examiner*—James Miner
*Attorney, Agent, or Firm*—Dvorak and Traub

[57] ABSTRACT

The rod has replaceable line guides and consists in at least one tubular element incorporating a socket insert serving to accommodate a corresponding shank with which the guide is provided, the insert being located between the internal and external surfaces of the tubular element, and its socket filled with a quick-setting meltdown glue that ensures stable anchorage of the shank; the tubular structure is fashioned by winding first sheets of composite material onto a mandrel until a given thickness is reached, then applying and fixing the insert to the external surface of the first winding to establish the socket, whereupon further material is wound on to an increased thickness, sufficient at least to embed the insert. Alternately, the insert may be made from dissolvable material.

6 Claims, 2 Drawing Sheets

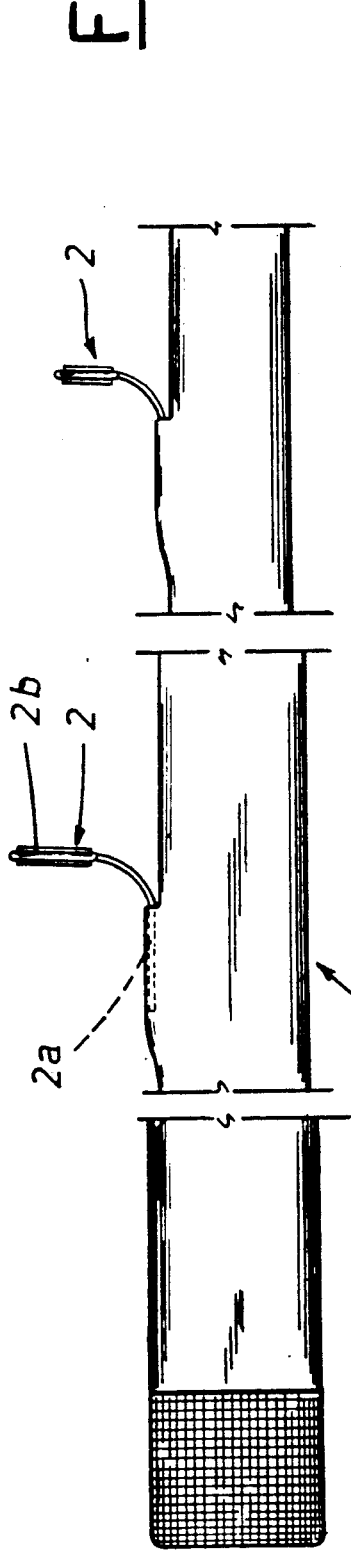
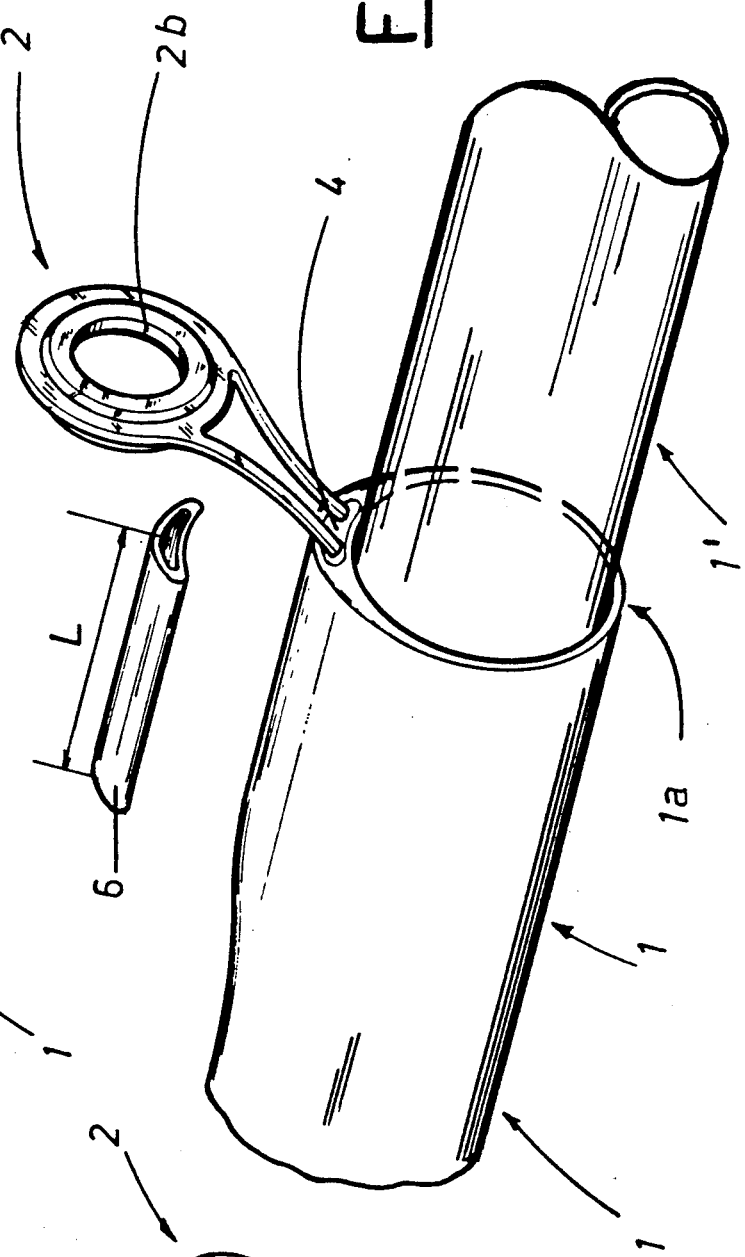
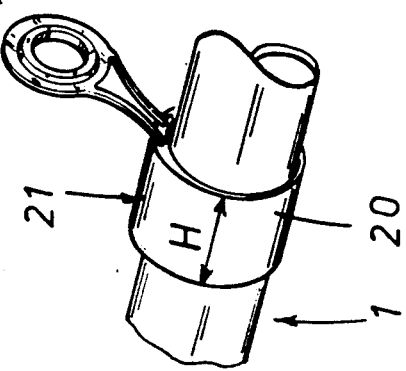

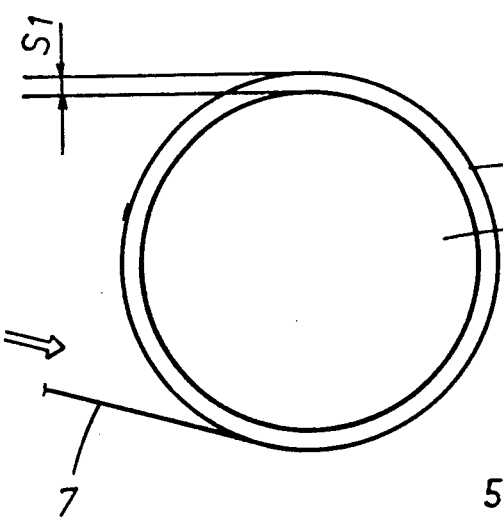
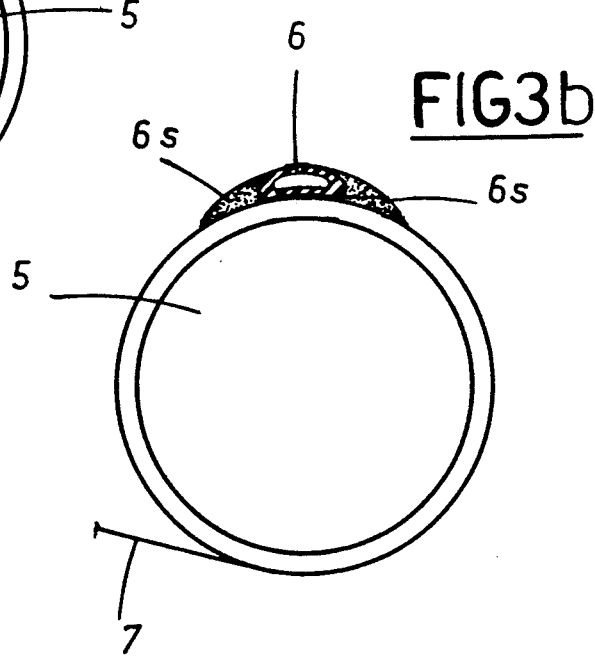
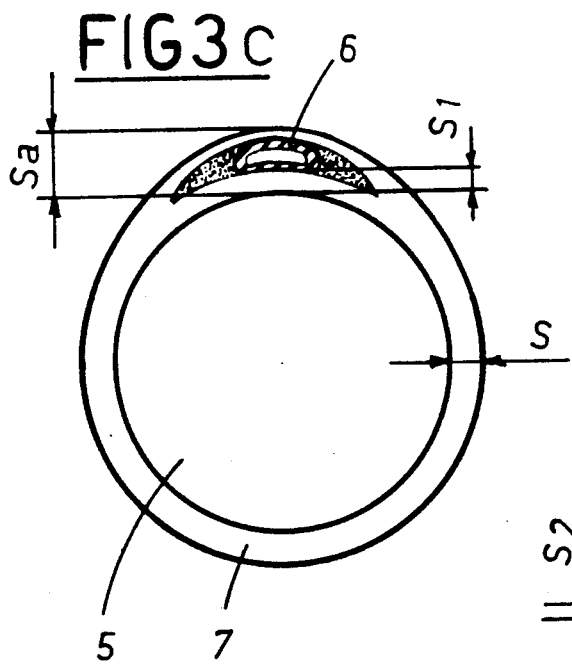
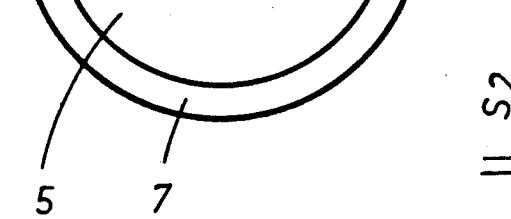
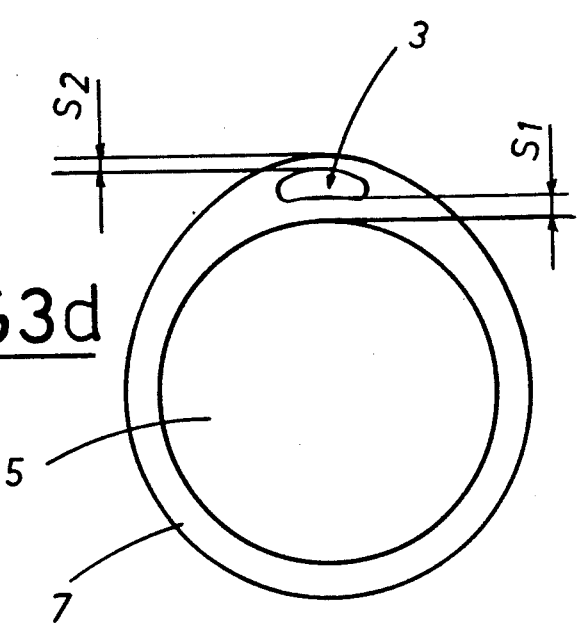

FISHING ROD WITH INTERCHANGEABLE LINE GUIDES, AND THE METHOD OF EMBODYING SUCH A ROD

BACKGROUND OF THE INVENTION

The present invention relates to a fishing rod with interchangeable line guides, and to the method of fashioning such a rod.

Manufacturers and retailers of fishing rods are aware of the difficulties experienced in producing rods with line guides that afford a good level of interchangeability, according to the requirements of the user.

There are two methods and materials conventionally adopted for the fitment of line guides: first, by means of a band of metal or plastic to which the line guide ring is fastened at right angles via its external surface; the band is rolled into a circle of which the circumference enables fitment over the projecting end of a section of rod, and made secure generally by glueing. The second method consists in providing the guide ring with one, or preferably two shanks disposed substantially perpendicular to the plane occupied by the ring and extending in opposite directions one to the other; such a ring is offered to the external surface of the section of rod in the appropriate position (generally at one end) and secured in place by whipping the shank with a suitable thread.

These two methods are beset by notable drawbacks, however, from the standpoints of interchangeability and economy. In the first arrangement outlined, the assembly of ring and band must necessarily be replaced in its entirety in the event of the user wishing to modify the sections of the rod to suit a different type of sport, the expense of which is not inconsiderable, especially if the rod happens to be telescopic, i.e. consisting in a plurality of tapered sections, with several intermediate bands to replace; moreover, it will be unlikely that the bands replaced can be reutilized, except on a rod that happens to exhibit identical diameters.

Plastic or metal bands also increase the weight of the rod, affecting its handling and contributing to the vibrations induced when the rod is extended and in use; in this instance the time taken to damp vibration is increased, whereas anglers prefer a fast recovery. Shanked line guides are generally fitted by hand, and afford the undoubted advantage of adaptability to any type of rod blank, though in practice the interchangeability gain is negligible when set against the time and patience required in fitment; and yet, this very interchangeability is an important feature in fishing rods, as the modern angler demands dedicated line guides for use with different blanks, of which the design depends on the length of the rod, the type of sport, the reel selected, and so forth . . .

Accordingly, the object of the present invention is one of overcoming the drawbacks mentioned above by offering a fishing rod with swiftly interchangeable and inexpensive line guides that can be fitted by the owner or user of the rod directly, as and when effectively required, while guaranteeing no adverse effect whatever on the strength and dimensional characteristics of the assembled rod and optimizing the feature of weight reduction, which is crucial in any evaluation of such a concept.

SUMMARY OF THE INVENTION

The stated object is realized with a fishing rod according to the present invention, which consists in at least one tubular element incorporating one tubular socket for each line guide, serving to accommodate a corresponding shank associated with the guide ring and disposed between the external and internal surfaces of the tubular element.

Coupled thus together, the shank and socket are invested with a fixing medium that ensures their remaining stably together.

The method disclosed comprises the steps of winding sheets of material onto a mandrel until a given thickness is reached, applying and fixing a tubular insert to the outer surface of the wound material, thus providing the socket, and winding on further material locally to an increased thickness such as will at least envelop the insert.

Among the advantages of a fishing rod according to invention is the fact that its user is afforded a selection, and if necessary, a swift and simple changeover of line guides; more exactly, with the shank of each line guide ring held in its socket by means of a melt-down glue, it suffices simply to warm the socket area of the rod so as to soften the glue and release the shank; removal accomplished, the shank of the replacement ring can be inserted into the socket and a fresh bond effected.

BRIEF DESCRIPTION OF THE DRAWINGS

The invention will now be described in detail, by way of example, with the aid of the accompanying drawings, in which:

FIG. 1 illustrates part of a one-piece fishing rod according to the invention, seen in side elevation with certain parts omitted better to reveal others;

FIG. 2 illustrates part of a sectional telescopic fishing rod according to the invention, viewed in perspective;

FIGS. 3a-b-c-d are schematic frontal elevations showing the steps involved in fashioning a tubular element to form part of the fishing rod according to the invention, as illustrated in FIGS. 1 and 2.

FIG. 4 illustrates an alternative embodiment of the invention, in which the interchangeable line guide is applied to a similarly interchangeable tubular element.

DESCRIPTION OF THE PREFERRED EMBODIMENTS

With reference to the drawings, the fishing rod according to the present invention is of the type consisting essentially in a tubular element of tapered profile, denoted 1 in FIGS. 1 and 2, which will be fashioned generally by winding overlapped sheets of synthetic fiber to a given thickness, denoted S in FIG. 3; a typical example would be the conventional rod blank molded in carbon fiber reinforced plastic.

FIG. 1 illustrates a one-piece rod (such as would be used in fly fishing, for example), whilst FIG. 2 shows part of a typical sectional rod composed of telescopic elements.

The outer surface of the tubular element 1 affords a plurality of line guides 2 (in the case of the one-piece rod, spaced apart at regular intervals along its length), each consisting in a circular ring denoted 2b, and a fixing shank 2a disposed substantially at right angles to the plane occupied by the ring 2b.

Conventionally, the line guides 2 are distributed at regular intervals along the tubular element 1, fixed or attached with the shank 2a longitudinally disposed and the ring 2b perpendicular. According to the present invention, the tubular element 1 of a conventional rod thus far described is provided with a longitudinal socket insert 6 for each of the line guides 2, serving to accommodate the relative shank 2a; the insert affords one open end and is lodged between the internal and external surfaces of the tubular element 1, effectively forming an integral part of the rod as discernible from FIGS. 1 and 2, in which the element 1 will be seen to exhibit a certain protruberance at the area 1 occupied by the longitudinal insert 6.

To ensure stability of the guide shank 2a and the longitudinal socket insert 6 when paired together, use is made of fixing means, denoted 4 in FIG. 2, which directly invest the two parts in question. More exactly, such fixing means 4 consist in a quick-setting single or dual component adhesive or a melt-down glue applied either internally of the insert 6, or preferably, direct to the shank 2a, the function of which is to hold the shank firmly in place in the socket. Advantageously, to enhance the adaptability of the system as a whole, the glue will be of a type that can readily be melted simply by applying heat, thereby allowing a speedy and ready extraction of the shank 2a from the socket. It will be clear enough that the notion of a rod blank incorporating longitudinal socket inserts 6 to accommodate line guides is especially suited to the more widely used telescopic design illustrated in FIG. 2, i.e. consisting in a plurality of tapered tubular elements 1. Each such element is fashioned from sheets of synthetic fibers impregnated with a resin matrix and wound one over another to a given thickness S, and exhibits dissimilar end diameters in such a way that one element can be fitted into another. Each such element 1 carries a relative line guide 2 as described above, with the ring 2b perpendicularly disposed; in this instance, each tapered tubular element 1 carries a longitudinal socket insert 6 at its end of smaller diameter, denoted 1a (i.e. that from which the successive telescopic element emerges). As discernible from FIG. 2, the socket insert 6 is again accommodated within the wall thickness of the mesh of synthetic fibers from which the blank is molded, exploiting the same manufacturing techniques as are adopted conventionally. The socket mouth of the insert 6 coincides with the frontal surface afforded by the end 1a of the element 1, though without obstructing the telescoping action of the successive smaller diameter element 1', clearly illustrated in FIG. 2. Likewise in this instance, the preferred method of securing the shank 2a in the socket insert 6 will be that of the quick-setting adhesive 4.

Referring to FIGS. 3a, b, c and d, the fishing rod according to the present invention is fashioned by a method involving three distinct steps, now to be described, from which the single tubular element 1 ultimately emerges. The first step (FIG. 3a) is one of wrapping sheets of synthetic fiber material, denoted 7, around a forming mandrel 5, building up to a prescribed thickness denoted S1.

The second step involves applying and securing a tubular insert 6, affording an internal socket, to the external surface of the material wound in the first step, at a position coinciding with one end of the mandrel 5 around which the material is wrapped. In a preferred embodiment, the insert 6 will be flanked by spacers 6s, one on either side, of which the shape is designed to restore a rounded section to the tubular element 1 following addition of the insert.

The third step consists in winding further sheets of the synthetic fiber material 7 up to the nominal blank thickness S of the element 1, in the process of which the entire tubular insert 6 will be buried under a thickness of material denoted S2.

On completion of the process thus described, the circumference of the tubular element 1 exhibits a slight deformation at the area of the insert 6, of which the overall thickness Sa is the sum of the thickness S1 of the first wrap, plus the depth of the insert itself, plus the thickness S2 of the further wrap. Alternatively, the insert 6 could be applied to the outer surface of the finished blank. The socket insert 6 will be of length L at least equal to the corresponding length of the shank 2a of the line guide, and appears as a tube flattened to what is substantially an elliptical section. In an alternative type of embodiment, use might be made of a disposable insert 6 in fashioning the tubular element 1, for example in the form of salts removable subsequently by being dissolved, in which case the shank 2a of the line guide is accommodated in the cavity 3 remaining between the two relative thicknesses of material S1 and S2 that make up the tubular element (see FIG. 3d).

Thus, the angler is given a freedom of choice as to which line guides may best suit the preferences or needs of the moment, and by virtue of a replacement system that places no conditions on subsequent use; indeed the guides may be removed altogether and the rod used with a fixed line, without prejudice in any way to its constructional features.

FIG. 4 illustrates a further example of how the line guide according to the invention might be embodied; the guide is again interchangeable, and associated in this instance with an annular element 20 of given length denoted H; a protruberance coinciding with a given longitudinal generator 21 of the element indicates the presence of the socket insert by which the fixing shank of the line guide 2 is accommodated.

The annular element 20 can be embodied in a variety of sections to enable its being fitted forcibly over a corresponding variety of rod blank sections; accordingly, such an expedient will be especially advantageous in the instance of the one-piece rod, where the fully integrated type of socket poses greater difficulty as already intimated.

The annular element 20 might consist simply in a metal band to which the socket insert 6 is applied externally (e.g. with adhesive), or alternatively, use could be made of a composite material (similar to that of the rod), and an insert 6 or cavity 3 incorporated by means of the method disclosed.

This particular solution permits of customizing the position, number and size of line guides to suit personal requirements; the annular elements 20 can in effect be distributed strategically along the rod 1 at preferred distances by the angler and left in place, with subsequent modification limited to removing and replacing the actual line guides 2.

What is claimed:

1. A fishing rod with interchangeable line guides, comprising:
   a plurality of tapered tubular elements exhibiting dissimilar end diameters and insertable thus one element into the next;
   a plurality of line guides numbering at least one to each tubular element and disposed substantially perpendicular to the longitudinal dimension of the tubular element, each comprising a circular ring and a fixing shank disposed substantially at right angles to the plane defined by the circular ring;

a plurality of tubular inserts open at one end, incorporated one at least into each tubular element between the relative external and internal surfaces in such a way that its open end coincides with the frontal surface of the smaller diameter end of the element, and affording sockets to accommodate the shanks of respective line guides;

fixing means designed to invest the shank and the tubular insert and ensure a stable association of the one with the other.

2. A fishing rod as in claim 1, wherein fixing means consist in a glue applied internally of the tubular insert, by which the association of the shank with the insert is rendered stable.

3. A fishing rod as in claim 1, wherein fixing means consist in a quick-setting melt-down glue of which the properties are such as to permit removal of the shank when an increase in temperature occurs at the area of the element occupied by the tubular insert.

4. A fishing road as in claim 1, wherein the tubular insert consists in a tube open at one end, of length at least equal to the length of the fixing shank of the line guide, which is flattened to the point of assuming a substantially elliptical section.

5. A method for embodying a fishing rod comprising a tapered tubular element with interchangeable line guides distributed along its external surface, each comprising a circular ring and a fixing shank disposed substantially at a circular ring and a fixing shank disposed substantially at right angles to the plane defined by the circular ring, said tubular element rigidly incorporating at least one tubular insert open at one end and providing a socket to accommodate the shank of a relative line guide, wherein the single tubular element is fashioned by the successive steps of:

winding sheets of synthetic fiber material around a mandrel until arrival at a given thickness;

applying and securing a tubular socket insert to the external surface of the synthetic fiber material wound in the first step; and winding further sheets of synthetic fiber material until arrival at a thickness whereby the tubular insert is completely embedded, wherein the socket insert consists in a disposable element, and the step of winding further sheets is followed by a step of dissolving the insert in such a way as to leave behind a cavity.

6. A method for embodying a fishing rod comprising a tapered tubular element with interchangeable line guides distributed along its external surface, each comprising a circular ring and a fixing shank disposed substantially at right angles to the plane defined by the circular ring, said tubular element comprising a plurality of annular elements each incorporating a tubular insert open at one end and providing a socket to accommodate the shank of a relative line guide, wherein each annular element is fashioned by the successive steps of:

winding sheets of synthetic fiber material around a mandrel until arrival at a given thickness;

applying and securing a tubular socket insert to the external surface of the synthetic fiber material wound in the first step; and winding further sheets of synthetic fiber material until arrival of a thickness whereby the tubular insert is completely embedded, a step of dissolving the insert in such a way as to leave behind a cavity.

* * * * *